July 9, 1929.  F. M. WILSON  1,720,253
INCUBATOR
Filed July 11, 1927  2 Sheets-Sheet 2
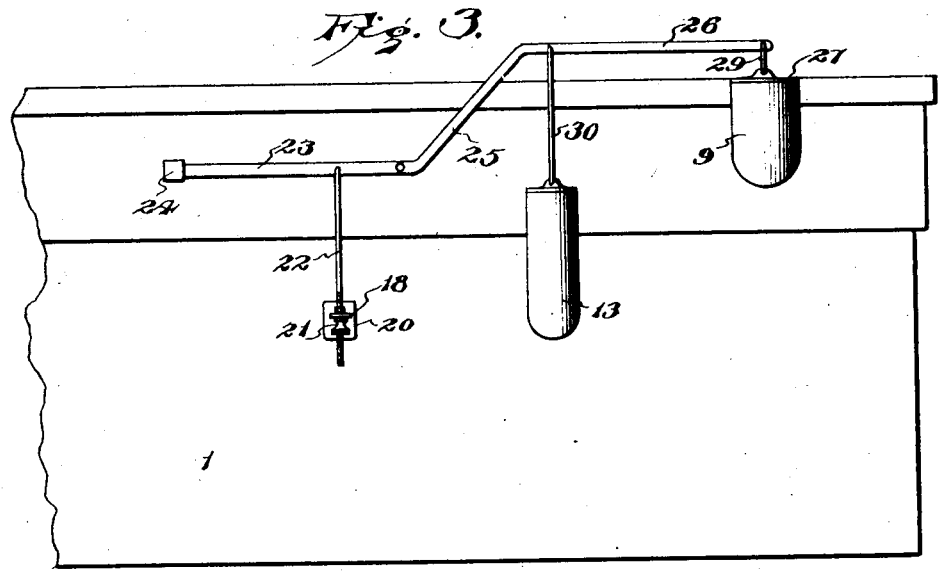
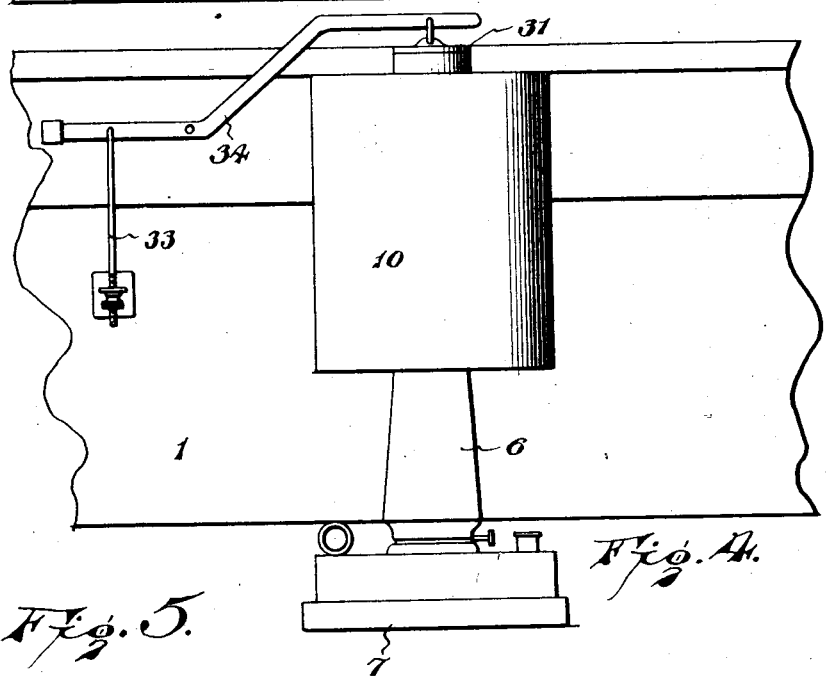
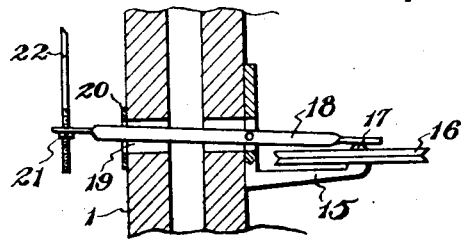
Inventor
F. M. Wilson
By Lacey & Lacey, Attorneys Patented July 9, 1929.

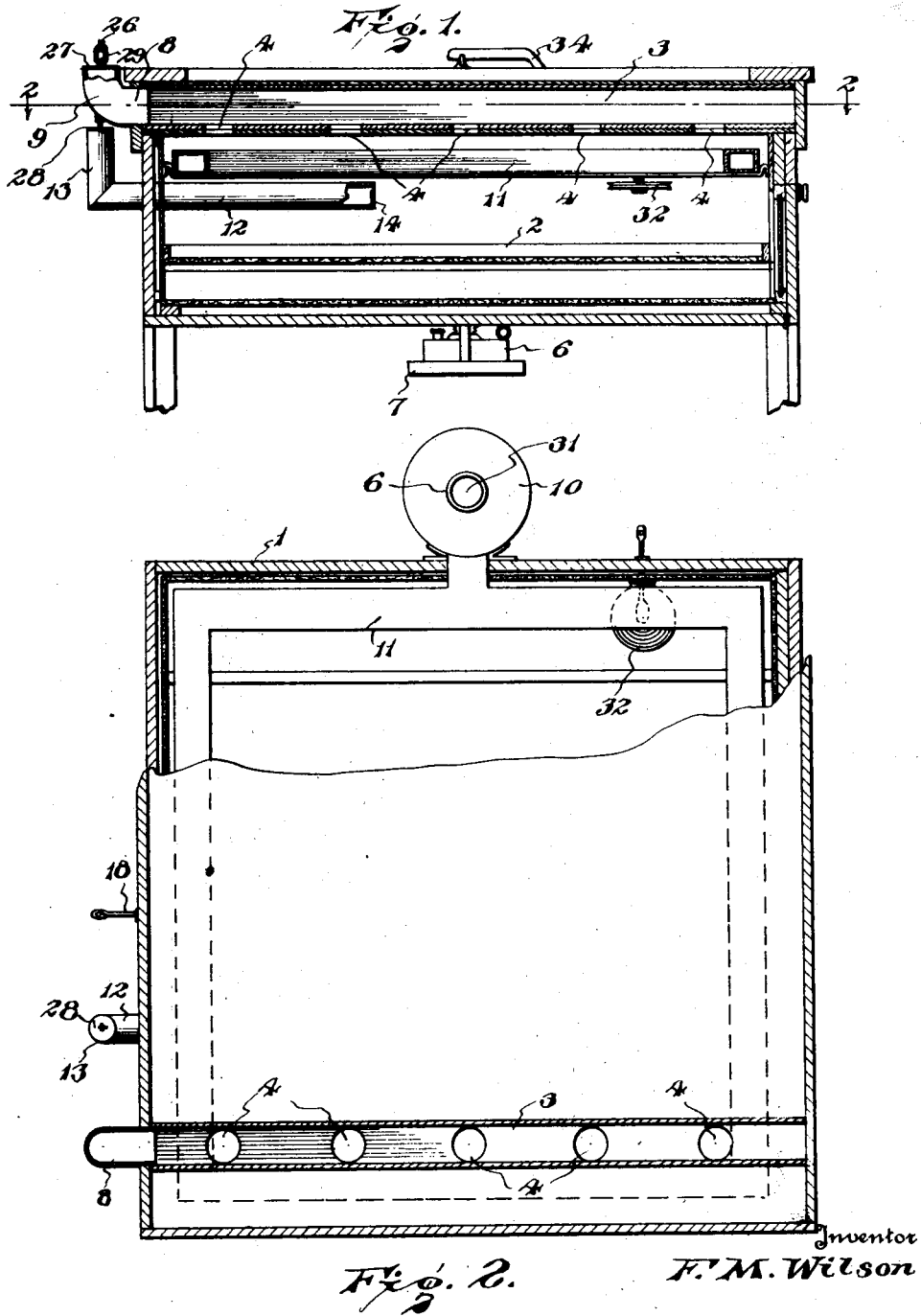

1,720,253

UNITED STATES PATENT OFFICE.

FRANK M. WILSON, OF HAINES CITY, FLORIDA.

INCUBATOR.

Application filed July 11, 1927. Serial No. 204,948.

This invention relates to incubators and has special reference to the ventilation of the same, the object being to provide a simple, inexpensive and efficient mechanism whereby the foul air of the incubator will be automatically exhausted when the temperature of the incubator reaches a predetermined degree. The invention also has for its object the provision of means whereby fresh air will be admitted to the incubator when the foul air is exhausted. The invention is illustrated in the accompanying drawing and consists in certain novel features which will be hereinafter first fully described and then particularly pointed out in the appended claim.

In the drawings:

Figure 1 is a vertical section of an incubator having my invention embodied therein;

Fig. 2 is a horizontal section approximately on the line 2—2 of Fig. 1;

Fig. 3 is a detail side elevation;

Fig. 4 is a detail rear elevation, and

Fig. 5 is a detail section showing a thermostat and the parts immediately adjacent and cooperating therewith.

The body of the incubator, shown at 1, is of the usual construction and an egg tray 2 of any approved form is supported therein in any desired manner. Extending across the incubator in or immediately below the top thereof is a hot-air tube 3 having a plurality of openings 4 through its bottom. A lamp or heater 6 is supported alongside of the incubator, preferably by a bracket 7 on the back wall, and a water compartment 10 is provided around the heater so that the water in this compartment will be thoroughly heated. From the upper end of the said compartment a water circulating tube or tank 11 extends into and around the interior of the incubator so that heat will be radiated to play upon the eggs in the egg tray and perform the hatching operation. The vent tube 3 is located above the tank and terminates in an outlet pipe 8 extending through the wall of the incubator and having an upturned end 9. Below the outlet pipe 8 and at one side thereof is disposed an air tube 12 which passes through the wall of the incubator and has its outer end upturned, as shown at 13, the inner extremity of this air tube being open but having a lip 14 on its bottom so that water may be fed into the tube and will be held upon the bottom of the same to evaporate and supply the needed moisture to the interior of the incubator in order that the desired humid condition of the air will be attained.

Supported upon a bracket 15 within the incubator is a thermostat 16 which is preferably in the form of an expansible and contractile metal chamber or hollow disk having a knob 17 upon its upper surface bearing against the under side of a lever or rocking arm 18 at the inner end thereof. The lever 18 passes through a slot 19 provided therefor in the wall of the incubator, and a suitable cap 20 is provided over the outer end of the said slot to fit closely to the lever so that it may rock under the influence of the thermostat but excessive leakage of air will be prevented. The outer end of the rocking arm 18 rests upon a nut 21 fitted upon a hanger 22 and adjustable thereon so that the throw or movement of the rocking arm may be accurately regulated. The hanger 22 is pivoted to and depends from a lever 23 which is fulcrumed upon the outer surface of the incubator, as shown in Fig. 3, and is provided at one end with a counterweight 24 whereby the lever will be nicely balanced and will operate easily when influenced by the thermostat through the rocking arm 18. The hanger 22 is attached to the lever at one side of its fulcrum and at the opposite side of the fulcrum the lever is bent upwardly, as shown at 25, and is then bent, horizontally, as shown at 26, to overhang the open outer ends of the outlet pipe 9 and the air pipe 13, dampers 27 and 28 being provided to rest upon the ends of the respective pipes and connected with the overhanging portion 26 of the lever by links 29 and 30.

At the outlet of the heater 6 is a damper 31 controlled by a thermostat 32 of the same form as the thermostat 16 and connected with the damper through a hanger 33 and lever 34.

Normally the dampers are seated upon the respective pipes so that their outer ends are closed as shown and heat will be retained within the incubator. It will be noted that the rocking arm 18 is fulcrumed nearer its inner end so that the outer end portion of the lever will overbalance the inner end and will tend to hold said inner end away from the thermostat. Consequently, if the nut 21 be adjusted downwardly, the inner end of the rocking arm will be disposed more or less out of contact with the pusher knob 17 of the thermostat and some expansion of the thermostat may occur without actuating the arm. The desired adjustment of the rocking arm having been effected, when the temperature of the air within the incubator reaches an abnormally high degree, the thermostat will be expanded so as to lift the inner end of the rocking arm 18 and, consequently, swing the outer end thereof downwardly so as to exert a pull upon the hanger 22 and rock the lever 23. When the lever 23 is rocked, the dampers 27 and 28 will obviously be raised from the respective pipes 9 and 13 and the foul hot air within the incubator may then pass out through the openings 4, the tube 3 and the outlet pipe 8, while fresh air will flow through the air pipe 12 into the incubator to take the place of the exhausted air. The inflowing air, of course, will reduce the temperature within the incubator and the dampers will then reseat automatically as the thermostat contracts. By supplying a small quantity of water to the air pipe 12 to be retained on the bottom of said pipe by the lip 14 as described, the desired humidity within the incubator will be attained inasmuch as the heat within the incubator will cause evaporation of said air and the wet vapor will pass over the lip 14 into the incubator. It will be noted that I have provided an exceedingly simple and inexpensive mechanism whereby the temperature of the incubator will be automatically maintained substantially constant and the hatching of the eggs will be accomplished without requiring extensive attention and with minimum loss of the eggs, and it will be understood that one or more vent tubes may be employed according to the size of the incubator.

Having thus described the invention, I claim:

The combination with an incubator chamber and an egg tray therein, of a hot-air tube extending across the interior of the incubator at the top thereof and having openings through its bottom, a damper normally closing the outer end of the tube, a fresh air tube extending through a wall of the incubator above the egg tray and having its outer end adjacent the outer end of the hot-air tube, a damper normally closing the outer end of the fresh air tube, a lever fulcrumed between its ends on a side of the incubator chamber, links connecting one end of said lever with the respective dampers, and a thermostat disposed within the incubator chamber and operatively connected with the opposite end of the lever.

In testimony whereof I affix my signature.

FRANK M. WILSON. [L. S.]